US009753667B2

(12) United States Patent
Hebig et al.

(10) Patent No.: US 9,753,667 B2
(45) Date of Patent: Sep. 5, 2017

(54) HIGH BANDWIDTH MEMORY AND GLITCH-LESS DIFFERENTIAL XOR

(71) Applicant: BROADCOM CORPORATION, Irvine, CA (US)

(72) Inventors: Travis Hebig, Lakeville, MN (US); Myron Buer, Savage, MN (US); Carl Monzel, Eagan, MN (US); Richard John Stephani, Saint Paul, MN (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 166 days.

(21) Appl. No.: 14/644,114

(22) Filed: Mar. 10, 2015

(65) Prior Publication Data
US 2016/0246506 A1    Aug. 25, 2016

Related U.S. Application Data

(60) Provisional application No. 62/118,454, filed on Feb. 19, 2015.

(51) Int. Cl.
    *G06F 3/06*       (2006.01)
    *G06F 13/16*      (2006.01)

(52) U.S. Cl.
    CPC ............ *G06F 3/064* (2013.01); *G06F 3/0613* (2013.01); *G06F 3/0629* (2013.01); *G06F 3/0644* (2013.01); *G06F 3/0673* (2013.01); *G06F 13/16* (2013.01)

(58) Field of Classification Search
    CPC ............ G06F 2207/7233; G06F 3/064; G06F 3/0629; G06F 13/16; G06F 3/0613; G06F 3/0644; G06F 3/0673

USPC .......................................................... 711/211
See application file for complete search history.

(56) References Cited

U.S. PATENT DOCUMENTS

| 5,040,179    | A  | * | 8/1991 | Chen        | H03M 13/15  |
|              |    |   |        |             | 714/759     |
| 5,313,475    | A  | * | 5/1994 | Cromer      | G06F 11/1056|
|              |    |   |        |             | 714/758     |
| 7,254,657    | B1 | * | 8/2007 | Lanfield    | G06F 13/4217|
|              |    |   |        |             | 710/105     |
| 2008/0109704 | A1 | * | 5/2008 | Christenson | G06F 11/1048|
|              |    |   |        |             | 714/766     |

(Continued)

*Primary Examiner* — Prasith Thammavong
*Assistant Examiner* — Alex Olson
(74) *Attorney, Agent, or Firm* — McDermott Will & Emery LLP (57) ABSTRACT

A high-bandwidth multiple-read memory device includes multiple memory blocks, multiple address input buses, and a number of output data buses. The memory blocks include an auxiliary memory block and each memory block include several memory sub-blocks including an auxiliary memory sub-block. The output data buses output data corresponding to addresses corresponding to the address input buses during a multiple-read operation. The addresses correspond to a single memory sub-block of the memory sub-blocks of a memory block. Also described is differential XOR circuit that includes a selection logic circuit, a precharger circuit, and a multiplexer. The selection logic circuit provides a complementary output signal corresponding to a single-ended input signal. The multiplexer provides, during an evaluate phase, a differential output signal.

16 Claims, 8 Drawing Sheets

(56) References Cited

U.S. PATENT DOCUMENTS

2011/0022791 A1* 1/2011 Iyer .................. G06F 12/08
    711/105
2011/0225475 A1* 9/2011 Kumar ............... G06F 11/1052
    714/763

* cited by examiner

| A | BT | BF | OUTT | OUTF |
|---|----|----|------|------|
| 0 | 0  | 1  | 0    | 1    |
| 0 | 1  | 0  | 1    | 0    |
| 1 | 0  | 1  | 1    | 0    |
| 1 | 1  | 0  | 0    | 1    |

HIGH BANDWIDTH MEMORY AND GLITCH-LESS DIFFERENTIAL XOR

CROSS-REFERENCE TO RELATED APPLICATIONS

This application claims the benefit of priority under 35 U.S.C. §119 from United States Provisional Patent Application 62/118,454 filed Feb. 19, 2015, which is incorporated herein by reference in its entirety.

TECHNICAL FIELD

The present description relates generally to memory circuits, and more particularly, but not exclusively, to a high bandwidth memory and a glitch-less differential exclusive OR (XOR).

BACKGROUND

Network processors requiring high memory bandwidth may use multi-port memory bit-cells, which are quite large and expensive to implement. For example, register file memories based on multi-port memory bit-cells may use 4-port memory bit-cells, each using four sets of pass gates, or 4-read port memory bit-cells using four sets of series transistors (e.g., NFET) for the read ports and pass gates for the write ports. These bit-cells, however, are substantially area expensive and can most commonly be used in small capacity register file application. The existing bit-cells and associated memory architectures are not suitable for use in large capacity memories as required by network processors.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In one or more aspects of the subject technology, methods and configurations for providing high-bandwidth memory are described. Further, a dynamic glitch-less differential XOR tree is disclosed, which can be leveraged in implementing the high-bandwidth memory of the subject technology. The subject technology can be employed in any semiconductor device that requires high-bandwidth memory (e.g., 1-2 GHz) or multi-port memory. The disclosed high-bandwidth memory has many advantageous features at circuit, system, and product levels. For example, at the circuit level, the subject technology can result in a significant (e.g., ~50%) improvement in density (read ports per $mm^2$) as compared to existing two-port algorithmic XOR memory. The system advantages include additional read bandwidth per unit area or smaller area for equal read bandwidth. At the product level, cost saving due to reduced die area and performance improvement due to additional read bandwidth is among the advantageous features. The differential XOR tree of the subject technology, not only is free from extra transitions (e.g., glitches), but can substantially reduce dynamic power in XOR peripheral logic (e.g., by ~80%) and the XOR peripheral area (e.g., by ~20%) and can result in a predictable worst case delay path.

Figure 1:
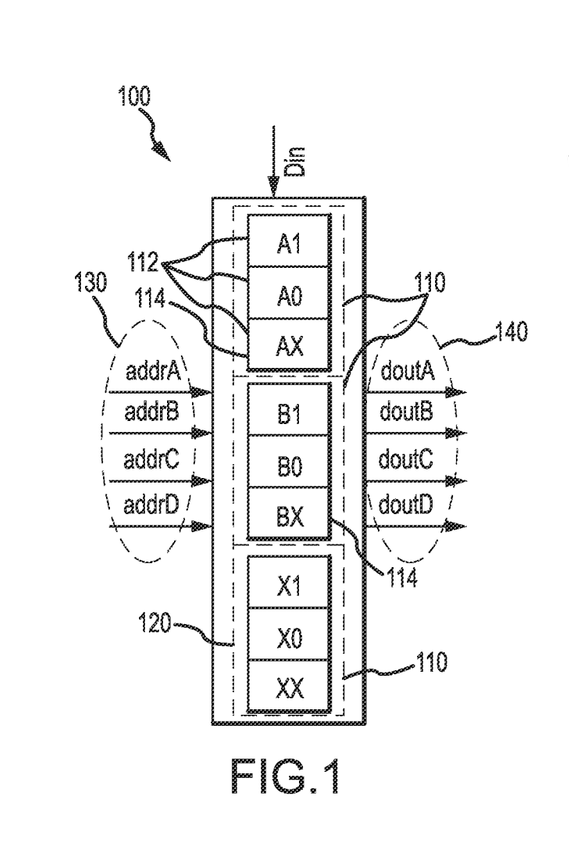
FIG. 1 illustrates an example of a high-bandwidth multiple-read memory device, in accordance with one or more implementations.

FIG. 1 illustrates an example of a high-bandwidth multiple-read memory device 100, in accordance with one or more implementations of the subject technology. The memory device 100 is partitioned into multiple (e.g., 3 or more) memory blocks (hereinafter "blocks") 110 including an auxiliary memory block (hereinafter "auxiliary block") 120. Each of the memory blocks 110 and 120 includes multiple memory sub-blocks (hereinafter "sub-blocks") 112 (e.g., A1, A0, B1, and B0) including an auxiliary memory sub-block (hereinafter "auxiliary sub-block") 114 (e.g., AX, and BX). The count of the sub-blocks (X1, X0, and XX) of the auxiliary block 120 is the same as the count of the sub-blocks of other blocks (e.g., 110). The memory device 100 can be any type of memory, for example, a SRAM memory formed by, for instance, 6-transistor (6-T) memory cells or other memory cells.

The memory device 100 includes multiple address input buses 130 including, for example, four address input busses corresponding to four input addresses addrA, addrB, addrC, and addrD. The memory device 100 also includes a number of output data buses 140, for instance, doutA, doutB, doutC, and doutD, to output data corresponding to multiple addresses corresponding to the address input buses 130 during a multiple-read operation. The addresses on the address input buses 130 can correspond to a single memory sub-block (e.g., A1, A0, B1, or B0) of one of the blocks 110 in which an input data (e.g., Din) is to be written in a write operation, as described herein. The high-bandwidth, high-capacity memory device of the subject technology can be implemented in a multiple-read one-write implementation. For simplicity, a four-read single write implementation is described herein. It is understood that the multi-read operation can result in an address collision if the multiple addresses to be read from belong to (e.g., multiple rows) of a single sub-block (e.g., A1, A0, B1, or B0). The subject technology resolves the address collision issue as described in more details herein.

The concept behind the implementation of the multiple-read (e.g., four-read) operation is the following Boolean equations: If A⊕B⊕C⊕D=n and B⊕C⊕D=m, considering the known equation A⊕A=0 gives: n⊕m=(A⊕(B⊕B)⊕(C⊕C)⊕(D⊕D))=A⊕0⊕0⊕0=A, where the symbol ⊕ denotes the XOR operation In other words, if we have "n", we can reconstruct A if we have "m". This concept is used herein to implement the multi-read (e.g., four-read) operation of the memory device 100 without any address collisions. In order to implement the multiple-read operation, the subject technology uses the auxiliary sub-blocks AX and BX to resolve first and second address collisions and the sub-blocks (e.g., X1, X0, and XX) of the auxiliary block 120 to resolve the third and fourth address collisions. The auxiliary sub-blocks AX, BX, X1, X0, and XX are not referred to by any real addresses and contain auxiliary data that can be used for multi-read address collision resolution. It is understood that the subject solution can be extended to more than four-address collisions by partitioning the memory device differently, for example, into blocks with more than four sub-blocks. In the four-address collision implementation discussed herein, the data content of the auxiliary sub-blocks are defined by the following Boolean equations:

$$AX = A0 \oplus A1 \quad \text{(Eq. 1)}$$

$$BX = B0 \oplus B1 \quad \text{(Eq. 2)}$$

$$X1 = A1 \oplus B1 \quad \text{(Eq. 3)}$$

$$X0 = A0 \oplus B0 \quad \text{(Eq. 4)}$$

$$XX = X1 \oplus X0 \quad \text{(Eq. 5)}$$

In other words, each auxiliary memory sub-block (e.g. AX or BX) that is not a part of the auxiliary memory block 120 contains primary auxiliary data. The primary auxiliary data is provided by at least one XOR gate that receives, during a write operation, input data from at least two memory sub-blocks (e.g., A0⊕A1 or B0⊕B1) of a respective memory block including that auxiliary memory sub-block. Each auxiliary memory sub-block (e.g., X1, X0, or XX) corresponding to the auxiliary memory block 120 contains secondary auxiliary data. The secondary auxiliary data is provided by at least one XOR gate that receives, during a write operation, input data from at least two memory sub-blocks (e.g., A1⊕B1, A0⊕B0, or A1⊕B1⊕A0⊕B0) of at least two memory blocks (e.g. 110 or 120). The XOR operation of the above equations are implemented using two-way XOR gates as explained below.

Figure 2:
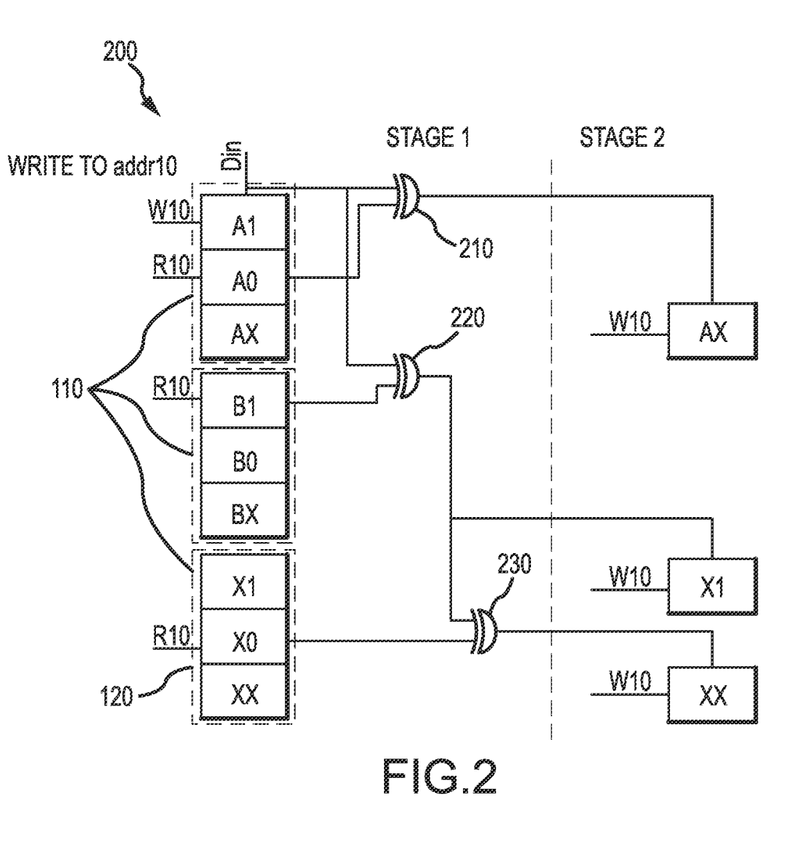
FIG. 2 illustrates an example of a write circuit of the high-bandwidth multiple-read memory device of FIG. 1, in accordance with one or more implementations.

FIG. 2 illustrates an example of a write circuit 200 of the high-bandwidth multiple-read memory device 100 of FIG. 1, in accordance with one or more implementations of the subject technology. In order to be able to perform the multi-read (e.g., four-read) operation without any address collision, the subject technology uses a hierarchical XOR architecture, as shown in FIG. 2. The hierarchical XOR architecture shown in FIG. 2, for simplicity uses two-way XOR gates. In some implementations the count of the inputs of the XOR gates depends on the count of the sub-blocks of blocks 110. For example, if the number of sub-blocks of each bock 110 was four, three-input XOR gates were used.

In the write circuit 200 shown in FIG. 2, a write to an address corresponding to the $10^{th}$ row of the sub-block A1 is described. The first pipe stage (e.g., stage 1) executes the actual write (e.g. W10) of the data (e.g., Din) to row 10 in sub-block A1. At the same time, a read operation is executed in row 10 of sub-blocks A0, B1, and X0. The second pipe stage (e.g., stage 2) execute write to AX, X1, and XX operations. The XOR gate 210 is used to perform the Boolean operation in Eq. 1, which provides XOR of A1 and A0. The XOR gate 220 performs the Boolean operation in Eq. 3 and provides XOR of A1 and B1, which is written to sub-block X1 of the auxiliary block 120. Finally, XOR 230 performs the Boolean operation in Eq. 5, which provides XOR of X1 and X0. It is to be noted that the XOR 230 uses, as one of its inputs, the output of the XOR 220, which is written to sub-block X1 and is the same as the content of sub-block X1. The content of the auxiliary sub-blocks AX, X1, and XX, as written, according to the above-discussed write operations, can be used to read the data from four different addresses of the sub-block A, as explained herein.

Figure 3A:
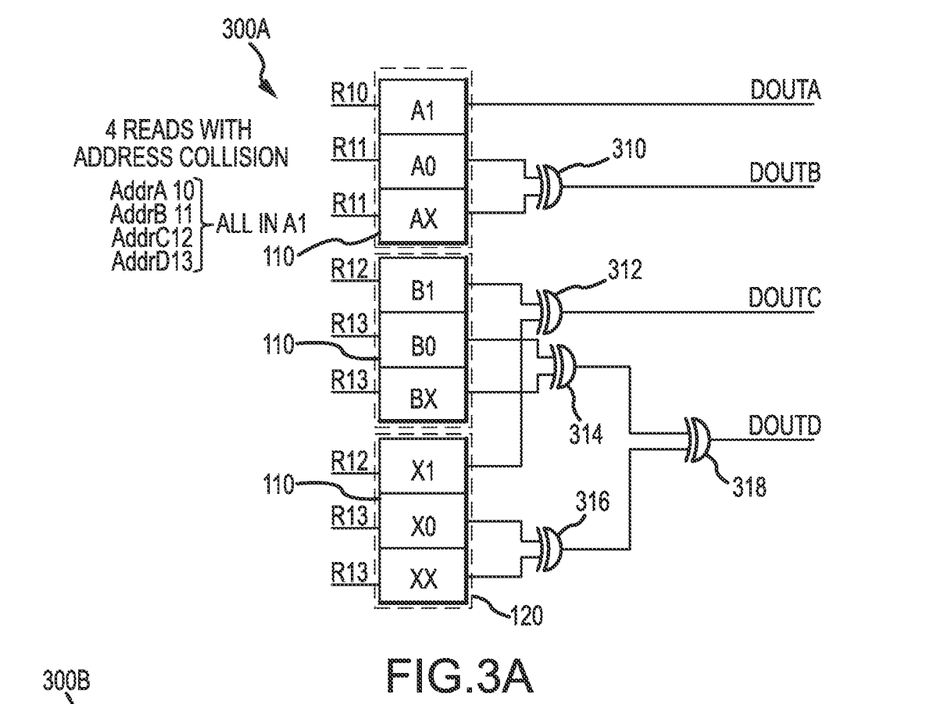
FIGS. 3A-3B illustrate examples of a read circuit and a data output path of the high-bandwidth multiple-read memory device of FIG. 1, in accordance with one or more implementations.
Figure 3B:
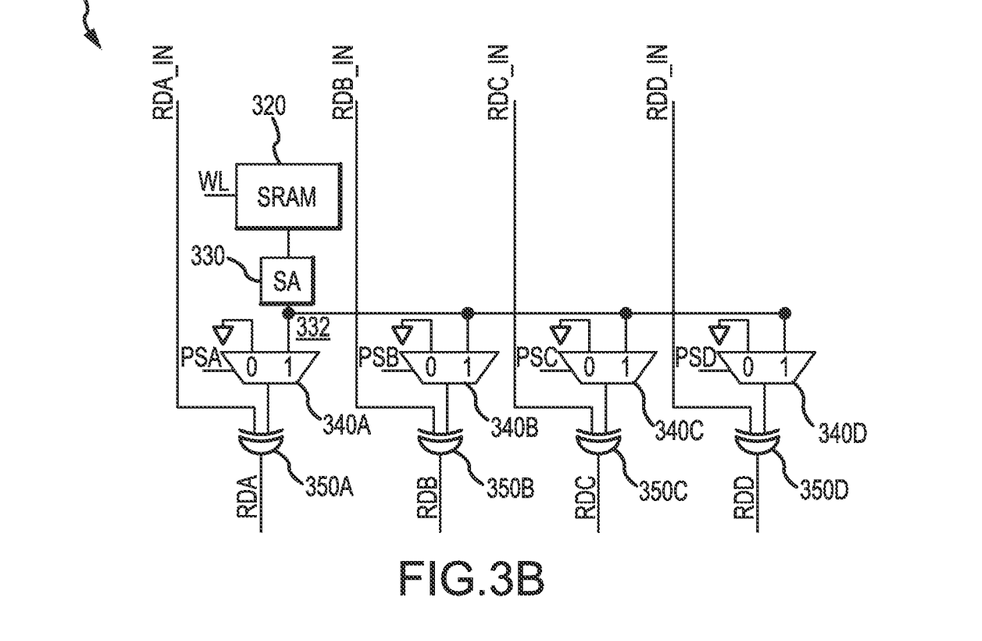

FIGS. 3A-3B illustrate examples of a read circuit 300A and a data output path 300B of the high-bandwidth multiple-read memory device 100 of FIG. 1, in accordance with one or more implementations of the subject technology. The read operation of the subject technology is performed by an example read circuit 300A. The read operation shown in FIG. 3A describes a four-way address collision resolution, where address ports A, B, C, and D (e.g., AddrA, AddrB, AddrC, and AddrD) are accessing rows 10, 11, 12, and 13, respectively, from the same sub-block (e.g., A1 of the block 110). Stated otherwise, address A is accessing data from an address corresponding to row 10 in sub-block A1; address B is accessing data from an address corresponding to row 11 in sub-block A1; address C is accessing data from an address corresponding to row 12 in sub-block A1; and address D is accessing data from an address corresponding to row 13 in sub-block A1. Note that the addresses A, B, C, and D are not accessing the same row of the sub-block A, but this is still an address collision since the addresses A, B, C, and D all correspond to rows in the same physical sub-block A1. It is to be noted that the case of all the addresses accessing the same address is handled in the same manner.

The read operation is performed as follows. Address port A accesses row 10 in sub-block A1 and outputs the data on DOUTA. Address port B cannot simultaneously use sub-block A1, so a read of row 11 (e.g., R11) from sub-blocks A0 and AX is performed and the data is output as DOUTB. Note that the port B data has just been re-created by the methods previously described, by performing A0⊕AX=A0⊕(A1⊕A0)=A1, using the XOR gate 310. Address port C cannot simultaneously use sub-block A1 or A0 or AX, so a read is performed of row 12 in sub-blocks B1 and X1 and the data is XOR'ed by the XOR gate 312 and passed to the respective output port as DOUTC. Address port D cannot simultaneously use sub-blocks that are already being accessed, so a read of row 13 in sub-blocks B0, BX, X0, and XX is performed by XOR gates 314 and 316 and the data from XOR gates 314 and 316 is XOR'ed together by the XOR gate 318 and passed to the respective output port as DOUTD. For simplicity, the XOR'ing of the data to be sent out as DOUTD is shown to be performed in two parallel stages. In some implementations, XOR'ing can be performed in series to provide the same logical result.

FIG. 3B shows a circuit diagram of some of the key data output path circuits. The diagram shows SRAM core cells depicted by a SRAM block 320, a sense amplifier 330, and a separate data output path for each data port. Each data path includes a two-input multiplexer (e.g., 340A, 340B, 340C, or 340D) followed by a respective XOR gate (e.g., 350A, 350B, 350C, or 350D). This circuit diagram of FIG. 3B represents the column circuits for each sub-block of the memory device 100 of FIG. 1. The inputs RDA_IN, RDB_IN, RDC_IN, and RDD_IN coming into the top of the circuit come from the outputs of a similar data output path circuit in a sub-block coupled (e.g., directly above) the data output path 300B.

When a read operation is performed, the data that is passed to each output port is either a buffered version of the data coming out of the sense amplifier, or it is re-created by XOR'ing data coming out of sense amplifiers from various sub-blocks. The XOR gates 350A, 350B, 350C, and 350D are connected in a daisy chain manner and the data 332 from a sub-block's sense amplifier (e.g., 330) can be passed into one of the daisy chained XOR trees formed by a multiplexer (e.g., 340A) and corresponding XOR gate (e.g., 350A). The port select signals PSA, PSB, PSC, and PSD control whether the data from a the sense amplifier 330 is passed onto a XOR tree (e.g., for a given port) or a 0 is passed into that XOR tree. Passing a 0 into the XOR tree indicates that the data from the current sub-block is not used to create the data going to the given port.

In some implementations, the operation of the data output path 300B is as follows. If a WL in a memory bank is fired, the port select input to that bank is also fired. The port select signals PSA, PSB, PSC, and PSD are one-hot signals that are separate for each bank. Passing the data 332 from the sense amp 332 implies that the data 332 is part of the data set that needs to be XOR'ed together to make the data for that port (e.g., RDA). Passing a 0 indicates that data 332 does not correspond to that port. Setting all PS signals for a particular port to 0 except one (e.g., PSA) means that there was no address collision and the data 332 from that bank is just buffered with the XOR gate (e.g., 350A) and passed to the output. Since the XOR gates 350A, 350B, 350C, and 350D of each sub-block are daisy chained together, the proper data for each port appears at the end of the daisy chain.

Figure 4:
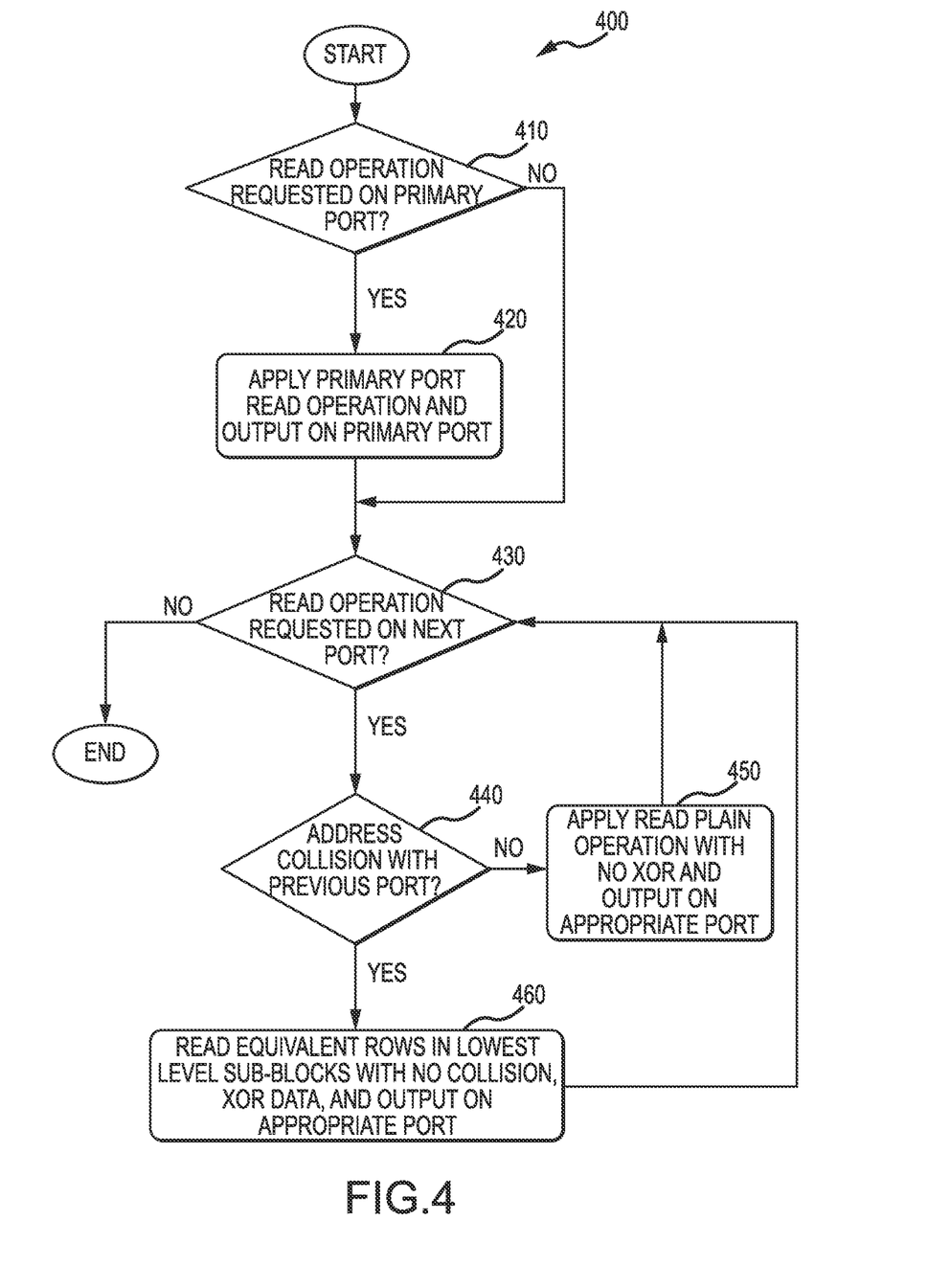
FIG. 4 is s flow chart illustrating an example algorithm for preforming a multi-read operation, in accordance with one or more implementations.

FIG. 4 is s flow chart illustrating an example algorithm 400 for preforming a multi-read operation, in accordance with one or more implementations of the subject technology. The multi-read operation described herein applies to, for example, the read circuit of FIG. 3A. The algorithm start at a control operation block 410, where it is checked whether a read operation is requested on a primary port (e.g., a port of A1 of FIG. 3A). If the answer is no, go to a control operation block 430. Otherwise, if the answer is yes, the control is passed to an operation block 420, where a read operation is performed on the primary port and the content of the respective address is outputted on the primary output port (e.g., as DOUTA) and control is passed to control operation block 430. At control operation block 430, it is checked whether a read operation on a next port is requested. If the answer is no, no read operation is performed. However, if the answer is yes, control is passed to control operation block 440, where it is checked whether there is a collision with a previous port (e.g., the addresses belong to a single memory sub-block). If no collision occurred, at operation block 450, a plain read operation with no XOR is performed, the output is passed to an appropriate port, and control is passed to operation block 430. Otherwise, if the answer is yes, at operation block 460, equivalent rows (e.g., R11 of FIG. 3A) in the lowest level sub-block (e.g., A0 of FIG. 3A) with no collision is read and XOR-ed with the respective auxiliary sub-block (e.g., AX), the result is outputted to an appropriate output port, and control is passed to control operation block 430.

In some implementations, the algorithm 400 is performed by a local processor, for example, a processor or a controller of a network switch or router, or a remote processor such as a cloud processor. In one or more implementations, the algorithm 400 is implemented in firmware or hardware such as a field-programmable gate array (FPGA).

Figure 5:
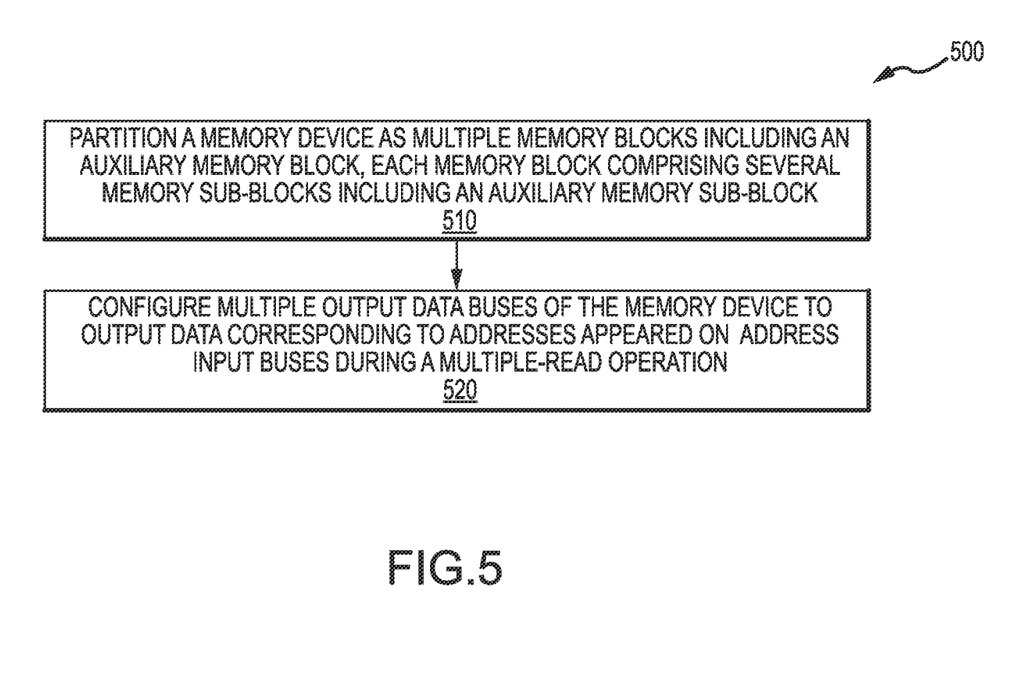
FIG. 5 illustrates an example of a method for providing a high-bandwidth multiple-read memory device in accordance with one or more implementations.

FIG. 5 illustrates an example of a method 500 for providing a high-bandwidth multiple-read memory device in accordance with one or more implementations of the subject technology. For explanatory purposes, the blocks of the example method 500 are described herein as occurring in serial, or linearly. However, multiple blocks of the example method 500 can occur in parallel. In addition, the blocks of the example method 500 need not be performed in the order shown and/or one or more of the blocks of the example method 500 need not be performed.

According to the method 500, a memory device (e.g., 100 of FIG. 1) is partitioned as multiple memory blocks (e.g., 110 of FIG. 1) including an auxiliary memory block (e.g., 120 of FIG. 1), each memory block comprising several memory sub-blocks (e.g., A1, A0, B1, B0 of FIG. 1) including an auxiliary memory sub-block (e.g., Ax or BX of FIG. 1) (510). Multiple output data buses (e.g., 140 of FIG. 1) of the memory device output data corresponding to addresses (e.g., AddrA, AddrB, AddrC, or AddrD of FIG. 1) corresponding to address input buses (e.g., 130 of FIG. 1) during a multiple-read operation (520).

Figure 6A:
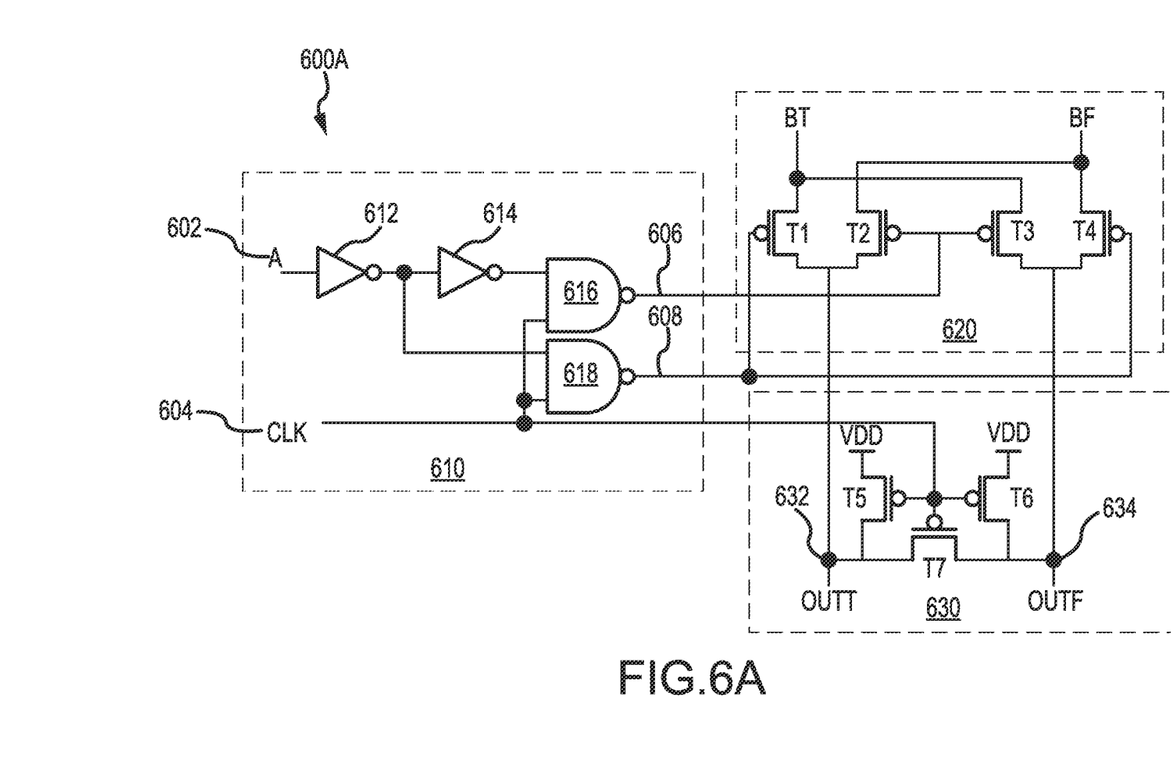
FIGS. 6A-6B illustrate examples of a differential exclusive OR (XOR) circuit and corresponding truth table, in accordance with one or more implementations.
Figure 6B:
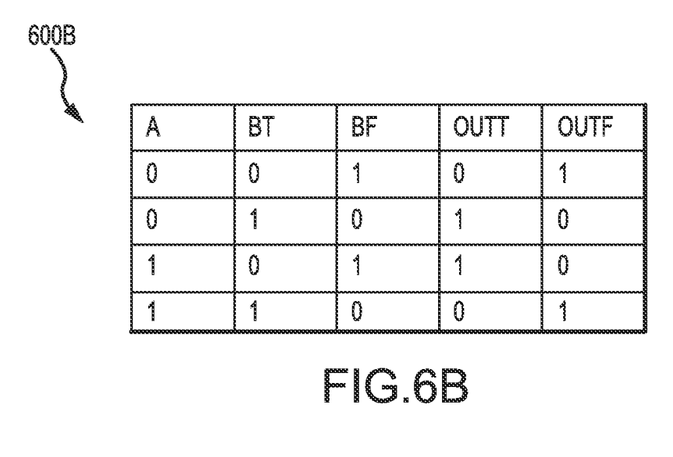

FIGS. 6A-6B illustrate examples of a differential exclusive OR (XOR) circuit 600A and corresponding truth table 600B, in accordance with one or more implementations of the subject technology. In one or more implementations, a differential XOR circuit 600A includes a selection logic circuit 610, a multiplexer 620 and a precharge circuit 630. The selection logic circuit 610 receives a single-ended input signal 602 and a clock signal 604 and provides a complementary output signals 606 and 608 corresponding to the single-ended input signal 602. In some implementations, the selection logic circuit 610 includes inverter 612 and 614 and NAND gates 616 and 618. The NAND gate 616 receives, as inputs, an output signal from inverter 614, which is similar to signal 602, and the clock signal 604 and provides the output signal 606. The NAND gate 618 receives, as inputs, an output signal from inverter 612 (e.g., inverted version of signal 602) and the clock signal 604 and provides the output signal 608. In one or more aspects, the selection logic circuit 610 can be implemented using NOR gates.

The multiplexer 620 receives a differential input signal BT and BF and the complementary output signals 606 and 608 and provides, during an evaluate phase (e.g., when clock signal 604 is high), a differential output signal (e.g., OUTT and OUTF) at the output nodes 632 and 634. In one or more implementations, the multiplexer 620 can be implemented by cross coupling two MOS pass-gates, formed for example, by PMOS transistor pairs T1-T2 and T3-T4. During the evaluate phase the input signal 602 (e.g., A) needs to be stable until a next precharge phase, which starts by clock signal 604 transitioning to low. In some implementations, the multiplexer 620 can be implemented otherwise, for example, by NMOS pass-gates, or in other configurations.

During the pre-charge phase, the pre-charger circuit 630 pre-charges output nodes 632 and 634 to a high level (logical 1). The pre-charge circuit 630 is implemented by transistors T5 and T6, and an optional transistor T7. Transistors T5-T7 are PMOS transistors but can be implemented by NMOS transistors as well. The clock signal 604 controls the common gate of the transistors T5-T7, and when low, allows transistors T5 and T6 to precharge output nodes 632 and 634 to the voltage supply voltage VDD level. As shown in the truth table 600b, the differential output signals OUTT and OUTF depend on the single-ended input signal 602 (e.g., A) and can be the same as the differential input signal (BT and BF) or a complement of the differential input signal. For example, when A is logical 0, OUTT and OUTF are the same as BT and BF, respectively. However, when A is logical 1, OUTT and OUTF are complements of BT and BF, respectively. The truth table 600b is consistent with a differential XOR truth table for input signals BT and BF, which confirms operation of the circuit 600A as a differential XOR, when in the evaluate phase. The glitch-less nature of the XOR circuit 600A can be seen from the truth table 600b that shows that in the evaluate phase, only one of BT or BF can go low or be low and then only one of the outputs (OUTT or OUT F) can go low as a result of that. In previously known XOR circuits, however, depending on the arrival times of the inputs, multiple transitions can be seen on the output.

In some implementations, the glitch-less and low dynamic power XOR circuit 600A can be employed to implement the XOR gates of FIGS. 2, 3A, and 3B to remove extra transitions, reduce dynamic power in XOR peripheral logic (e.g., by ~80%) and the XOR peripheral area (e.g., by ~20%), and to achieve a predictable worst case delay path.

In some implementations, the XOR circuit 600A can be implemented in multiple XOR stages, as explained herein.

Figure 7:
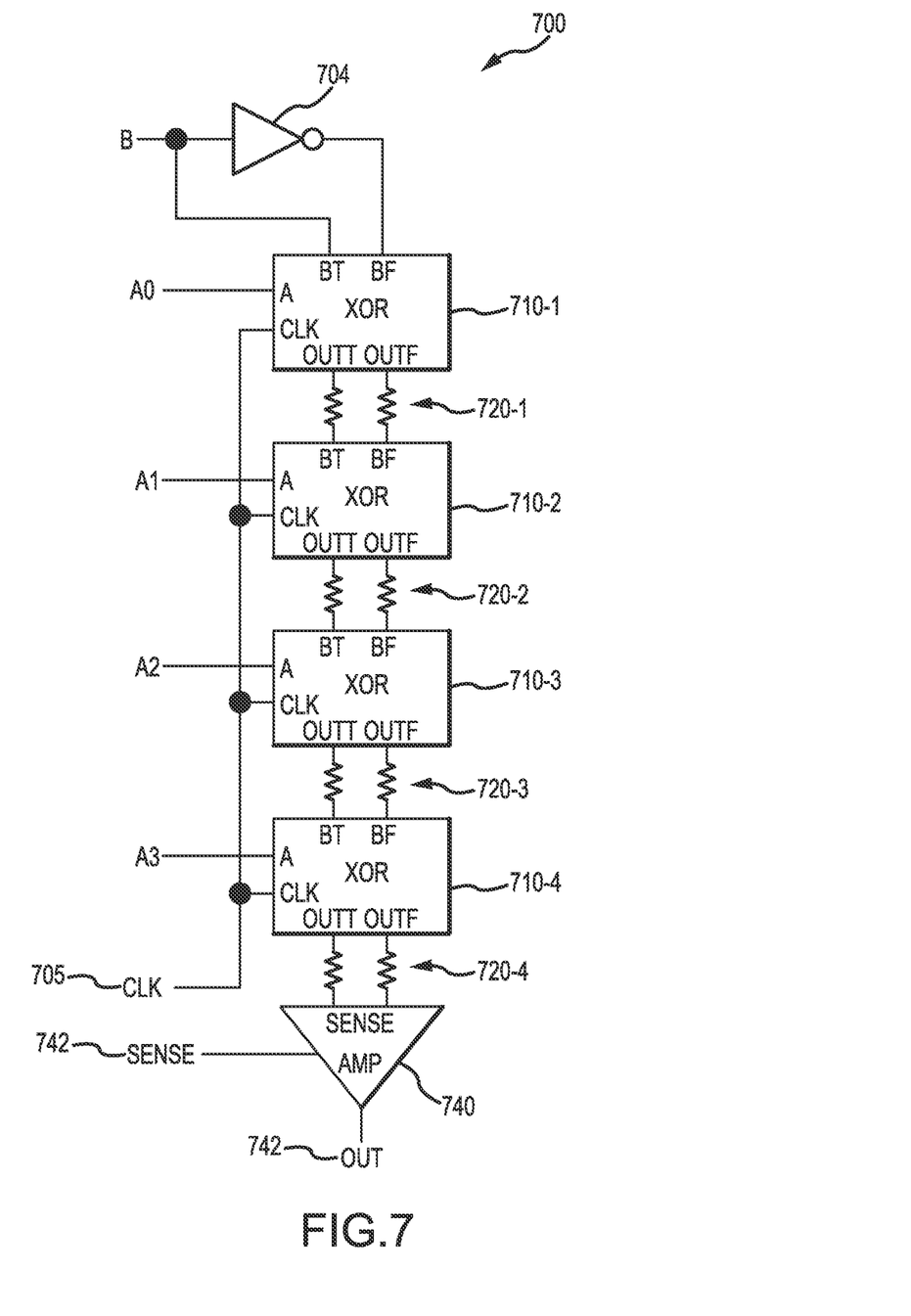
FIG. 7 illustrates an example of a multiple-stage differential XOR circuit, in accordance with one or more implementations.

FIG. 7 illustrates an example of a multiple-stage differential XOR circuit 700, in accordance with one or more implementations of the subject technology. The multiple-stage differential XOR circuit 700 shows how to connect four of the above-described XOR circuits (e.g., 710-1 to 710-4) to make a 5-input XOR function that can perform XOR function A0⊕A1⊕A2⊕A3⊕B on inputs A0, A1, A2, A3, and B. The B input is a single-ended input that is converted to differential by the inverter 704. In some applications, the physical distance between the XOR functions can be large because it needs to cross over long wires, as shown in the FIG. 7, where resistors 720-1 to 720-4 are used to denote the long wires crossed over by the XOR circuits 710-1 to 710-4. A sense amplifier 740 is used to sense the small differential signal of the XOR tree differential output to give a final single-ended output signal (OUT) at an output node 742 of the sense amplifier 740. The structure of each XOR circuit 710 is similar to the XOR circuit 600A and BT and BF inputs of each stage (e.g., 710-3) is the OUTT and OUTF of a previous stage (e.g., 710-2) that has passed through the long wires (e.g., denoted by resistors 720-2). The 4-stage differential XOR circuit 700 is just an example, and more stages can be coupled in a similar manner to form larger XOR trees.

Figure 8:
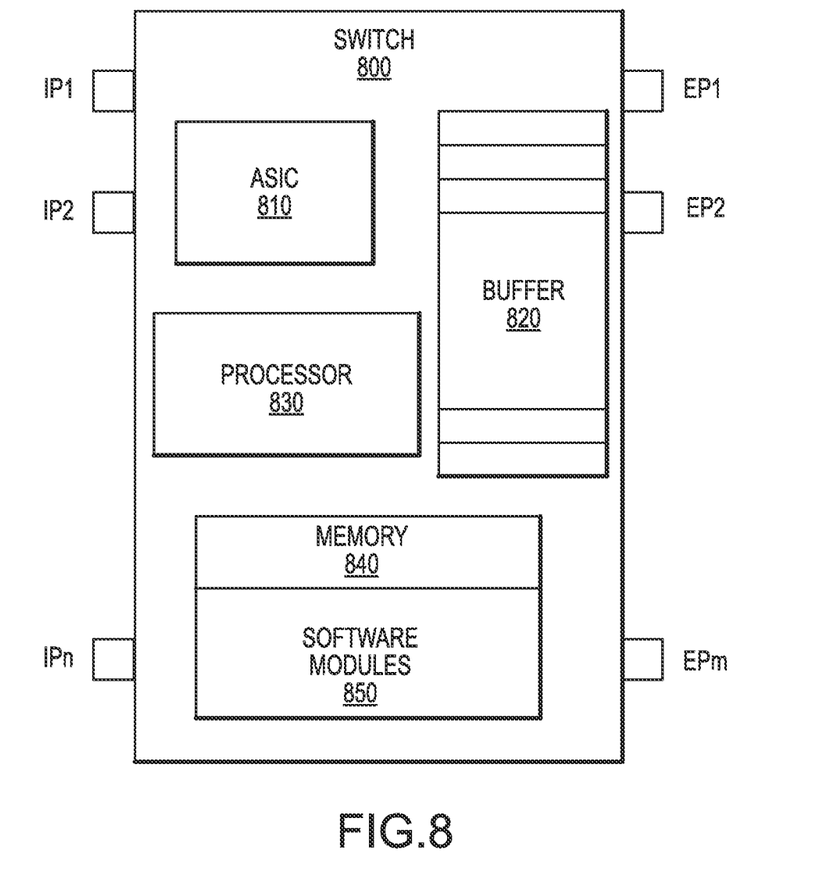
FIG. 8 illustrates an example of a communication device employing features of the subject technology in accordance with one or more implementations.

FIG. 8 illustrates an example of a communication device 800 employing features of the subject technology in accordance with one or more implementations of the subject technology. Examples of the communication device 800 includes an Ethernet switch of an Ethernet network such as a private network including a data-center network, an enterprise network, or other private networks. The communication device 800 includes a number of ingress (input) ports IP1-IPn and multiple egress (output) ports EP1-EPm. In one or more implementations, one or more of the ingress ports IP1-IPn can receive a data packet from another switch or and endpoint device of the network. The communication device 800 further includes a hardware component such as an application specific integrated circuit (ASIC) 810 (which in some embodiments can be implemented as a field-programmable gate array (FPGA)), a buffer 820, a processor 830, memory 840, and a software module 850.

In some implementations, the ASIC 810 can include suitable logic, circuitry, interfaces and/or code that can be operable to perform functionalities of a PHY circuit. The buffer 820 includes suitable logic, circuitry, code and/or interfaces that are operable to receive and store and/or delay a block of data for communication through one or more of the egress ports EP1-EPm. The processor 830 includes suitable logic, circuitry, and/or code that can enable processing data and/or controlling operations of the communication device 800. In this regard, the processor 830 can be enabled to provide control signals to various other portions of the communication device 800. The processor 830 also controls transfers of data between various portions of the communication device 800. Additionally, the processor 830 can enable implementation of an operating system or otherwise execute code to manage operations of the communication device 800. The processor 830 can also execute the algorithm 400 of FIG. 4 to perform a multi-read operation of the memory 840.

The memory 840 includes suitable logic, circuitry, and/or code that can enable storage of various types of information such as received data, generated data, code, and/or configuration information. The memory 840 includes, for example, RAM, ROM, flash, and/or magnetic storage. In various embodiment of the subject technology, the memory 840 may include a RAM, DRAM, SRAM, T-RAM, Z-RAM, TTRAM, or any other storage media. The memory 840 can include software modules 850 that when executed by a processor (e.g., processor 830) can perform some or all of the functionalities of the ASIC 810. In some implementations, the software modules 850 include codes that when executed by a processor can perform functionalities such as configuration of the communication device 800.

In some implementations, the memory 840 is a wideband multiport memory such as the memory device 100 of FIG. 1 and includes glitch-less XOR tree of the subject technology (e.g., 600A of FIG. 6A). This can result in a significant (e.g., ~50%) improvement in density as compared to existing two-port algorithmic XOR memory, cost saving due to reduced die area, and performance improvement due to additional simultaneous read operations capability. Using the differential XOR tree of the subject technology, can substantially reduce dynamic power in XOR peripheral logic (e.g., by ~80%) and the XOR peripheral area (e.g., by ~20%) and can result in a predictable worst case delay path.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A high-bandwidth multiple-read memory device, the device comprising:
a plurality of memory blocks including an auxiliary memory block, each of the plurality of memory blocks comprising a plurality of memory sub-blocks, the plurality of memory sub-blocks comprising an auxiliary memory sub-block, wherein the auxiliary memory block comprises a plurality of auxiliary memory sub-blocks, and wherein content of each auxiliary memory sub-block is based on content of at least some of the plurality of memory sub-blocks or auxiliary memory sub-blocks;
a plurality of address input buses; and
a plurality of output data buses configured to output data corresponding to a plurality of addresses, wherein the plurality of addresses correspond to the plurality of address input buses during a multiple-read operation,
wherein the multiple-read operation comprises reading the plurality of addresses corresponding to a single memory sub-block of the plurality of memory sub-blocks of a memory block of the plurality of memory blocks by using auxiliary memory sub-blocks, the auxiliary memory block, and one or more XOR gates.

2. The device of claim 1, wherein at least some of the plurality of output data buses are configured to be coupled to at least two memory sub-blocks other than the single memory sub-block through one or more XOR gates.

3. The device of claim 1, wherein a first output data bus of the plurality of output data buses is configured to output data corresponding to a first address of the plurality of addresses corresponding to a first address input bus of the plurality of address input buses during the multiple-read operation, wherein each of the auxiliary memory sub-blocks that is not part of the auxiliary memory block is configured to contain primary auxiliary data, and wherein at least one XOR gate is configured to provide the primary auxiliary data and is configured to receive, during a write operation, input data from at least two of the plurality of memory sub-blocks of a respective one of the plurality of memory blocks, the at least two of the plurality of memory sub-blocks including the each of the auxiliary memory sub-blocks.

4. The device of claim 1, wherein each auxiliary memory sub-block that is part of the auxiliary memory block is configured to contain secondary auxiliary data, wherein at least one XOR gate is configured to provide the secondary auxiliary data and is configured to receive, during a write operation, input data from at least two of the plurality of memory sub-blocks of at least two of the plurality of memory blocks.

5. The device of claim 1, wherein a last auxiliary memory sub-block of the auxiliary memory block is configured to contain ternary auxiliary data, wherein at least one XOR gate is configured to provide the ternary auxiliary data and is configured to receive, during a write operation, input data from at least two memory sub-blocks of the auxiliary memory block.

6. The device of claim 1, wherein a second output data bus is configured to output data corresponding to a second address of the plurality of addresses corresponding to a second address input bus during the multiple-read operation, and wherein the second output data bus is coupled to a first read XOR gate that is configured to receive data form a memory sub-block of a first memory block of the plurality of memory blocks and a respective auxiliary memory sub-block of the first memory block of the plurality of memory blocks.

7. The device of claim 1, wherein a third output data bus of the plurality of output data buses is configured to output data corresponding to a third address of the plurality of addresses corresponding to a third address input bus of the plurality of address input buses during the multiple-read operation, and wherein the third output data bus is coupled to a second read XOR gate that is configured to receive data form a memory sub-block of a second memory block of the plurality of memory blocks and a respective auxiliary memory sub-block of the second memory block.

8. The device of claim 1, further comprising a data output path corresponding to each memory sub-block of the plurality of memory sub-blocks, wherein the data output path comprises a multiplexer coupled to an output XOR gate, wherein output XOR gates are connected to form a daisy chained XOR tree, and wherein a sense amplifier of a memory sub-block is configured to pass data into one of XOR of the daisy chained XOR tree.

9. A method for providing a high-bandwidth multiple-read memory device, the method comprising:
   partitioning a memory device into a plurality of memory blocks including an auxiliary memory block, each memory block of the plurality of memory blocks comprising a plurality of memory sub-blocks including an auxiliary memory sub-block, wherein the auxiliary memory block comprises a plurality of auxiliary memory sub-blocks, and wherein content of each auxiliary memory sub-block is based on content of at least some of the plurality of memory sub-blocks or auxiliary memory sub-blocks; and
   configuring a plurality of output data buses of the memory device to output data corresponding to a plurality of addresses corresponding to a plurality of address input buses during a multiple-read operation,
   wherein
   the multiple-read operation comprises reading the plurality of addresses corresponding to a single memory sub-block of the plurality of memory sub-blocks of a memory block of the plurality of memory blocks by using auxiliary memory sub-blocks, the auxiliary memory block, and one or more XOR gates.

10. The method of claim 9, further comprising configuring at least some of the plurality of output data buses to be coupled to at least two memory sub-blocks of the plurality of memory sub-blocks other than the single memory sub-block through one or more XOR gates.

11. The method of claim 9, further comprising:
   configuring a first output data bus of the plurality of output data buses to output data corresponding to a first address of the plurality of addresses corresponding to a first address input bus of the plurality of address input buses during the multiple-read operation,
   writing to each auxiliary memory sub-block that is not part of the auxiliary memory block primary auxiliary data during a write operation, and
   configuring at least one XOR gate to provide the primary auxiliary data and to receive, during the write operation, input data from at least two of the plurality of memory sub-blocks of a respective memory block including the each auxiliary memory sub-block.

12. The method of claim 9, further comprising:
   writing to each auxiliary memory sub-block that is part of the auxiliary memory block secondary auxiliary data during a write operation, and
   configuring at least one XOR gate to provide the secondary auxiliary data and to receive, during the write operation, input data from at least two of the plurality of memory sub-blocks of at least two of the plurality of memory blocks.

13. The method of claim 9, further comprising:
   writing to a last auxiliary memory sub-block of the auxiliary memory block ternary auxiliary data during a write operation, and
   configuring at least one XOR gate to provide the ternary auxiliary data and to receive, during the write operation, input data from at least two memory sub-blocks of the auxiliary memory block.

14. The method of claim 9, further comprising configuring a second output data bus of the plurality of output data buses to output data corresponding to a second address of the plurality of addresses corresponding to a second address input bus of the plurality of address input busses during the multiple-read operation by coupling the second output data bus of the plurality of output data buses to a first read XOR gate, wherein the first read XOR gate is configured to receive data form a memory sub-block of a first memory block of the plurality of memory blocks and a respective auxiliary memory sub-block of the first memory block.

15. The method of claim 9, further comprising configuring a third output data bus to output data corresponding to a third address of the plurality of addresses corresponding to a third address input bus during the multiple-read operation by coupling the third output data bus to a second read XOR gate, wherein the second read XOR gate is configured to receive data form a memory sub-block of a second memory block of the plurality of memory blocks and a respective auxiliary memory sub-block of the second memory block.

16. The method of claim 9, further comprising providing a data output path corresponding to each memory sub-block of the plurality of memory sub-blocks by coupling a multiplexer to an output XOR gate and connecting output XOR gates to form a daisy chained XOR tree, and wherein a sense amplifier of a memory sub-block of the plurality of memory sub-blocks is configured to pass data into one of the output XOR gates of the daisy chained XOR tree.

* * * * *

UNITED STATES PATENT AND TRADEMARK OFFICE
CERTIFICATE OF CORRECTION

PATENT NO. : 9,753,667 B2
APPLICATION NO. : 14/644114
DATED : September 5, 2017
INVENTOR(S) : Travis Hebig et al.

Page 1 of 1

It is certified that error appears in the above-identified patent and that said Letters Patent is hereby corrected as shown below:

In the Claims

Claim 6, Column 10, Line 56, "to receive data form" should read --to receive data from--.

Claim 7, Column 11, Line 1, "form a memory" should read --from a memory--.

Claim 14, Column 12, Line 30, "receive data form" should read --receive data from--.

Claim 15, Column 12, Line 39, "receive data form" should read --receive data from--.

Signed and Sealed this
First Day of October, 2019

Andrei Iancu
*Director of the United States Patent and Trademark Office*